(12) United States Patent
Shridhar et al.

(10) Patent No.: US 7,881,362 B2
(45) Date of Patent: Feb. 1, 2011

(54) METHOD AND APPARATUS FOR DIFFERENTIATED COMMUNICATION CHANNEL ROBUSTNESS IN A MULTI-TONE TRANSCEIVER

(75) Inventors: Avadhani Shridhar, Santa Clara, CA (US); Sam Heidari, Menlo Park, CA (US); Rouben Toumani, San Jose, CA (US); Ying Wu, Cupertino, CA (US)

(73) Assignee: Ikanos Communications, Inc., Fremont, CA (US)

(*) Notice: Subject to any disclaimer, the term of this patent is extended or adjusted under 35 U.S.C. 154(b) by 700 days.

(21) Appl. No.: 11/901,346

(22) Filed: Sep. 15, 2007

(65) Prior Publication Data

US 2008/0069193 A1    Mar. 20, 2008

Related U.S. Application Data

(60) Provisional application No. 60/844,880, filed on Sep. 15, 2006.

(51) Int. Cl.
    *H04B 1/38* (2006.01)
(52) U.S. Cl. ........................... 375/219; 375/260
(58) Field of Classification Search ............... 375/219, 375/222, 260
    See application file for complete search history.

(56) References Cited

U.S. PATENT DOCUMENTS

| | | | |
|---|---|---|---|
| 6,134,273 A | 10/2000 | Wu | |
| 6,516,027 B1 | 2/2003 | Kapoor et al. | |
| 6,539,205 B1 | 3/2003 | Wan et al. | |
| 7,009,945 B1 | 3/2006 | Tang et al. | |
| 7,023,938 B1 | 4/2006 | Kapoor et al. | |
| 2002/0151323 A1 | 10/2002 | Bender et al. | |
| 2003/0123560 A1* | 7/2003 | Jacobsen et al. | 375/260 |
| 2004/0047296 A1 | 3/2004 | Tzannes et al. | |
| 2004/0120482 A1* | 6/2004 | Bentley et al. | 379/93.01 |

(Continued)

OTHER PUBLICATIONS

A. M. Wyglinski, F. Labeau, P. Kabal; "Bit Loading with BER-Constraint for MultiCarrier Systems" IEEE Transactions on Wireless Communications, vol. 4, No. 4, Jul. 2005; vol. 4, No. 4; pp. 1383-1387.

(Continued)

*Primary Examiner*—Emmanuel Bayard
(74) *Attorney, Agent, or Firm*—Charles C Cary; IP Creators

(57) ABSTRACT

A multi-tone transceiver including: a channel controller and a plurality of components forming a transmit path and a receive path. The channel controller configured to determine bit-loading for each successive symbol or tone set based on a $1^{st}$ noise margin target for a first subset of tones in each tone set dedicated to transport of a robust communications channel (RCC) and based on a $2^{nd}$ noise margin target less than the $1^{st}$ noise margin target for remaining tones in each tone set dedicated to a standard communications channel (SCC). The plurality of components forming the transmit and receive paths are responsive to the channel controller to select for data modulated on a given tone at least one of smaller constellations and higher gain scaling levels when the given tone corresponds to an RCC tone as compared to an SCC tone, whereby the first set of tones dedicated to the RCC exhibit greater immunity to noise variations than the remaining tones dedicated to the SCC.

21 Claims, 5 Drawing Sheets

U.S. PATENT DOCUMENTS

| | | |
|---|---|---|
| 2004/0218756 A1 | 11/2004 | Tang et al. |
| 2004/0240464 A1 | 12/2004 | Fite |
| 2006/0176942 A1 | 8/2006 | Oksman et al. |
| 2006/0251160 A1 | 11/2006 | Fazlollahi et al. |
| 2007/0258527 A1 | 11/2007 | Smileysky |

OTHER PUBLICATIONS

K. S. Jacobsen; "Fundamentals of Multi-Carrier Modulation"; Fundamentals of DSL Technology, Edited By P. Golden, H. Dedieu, K. S. Jacobsen; 2006; pp. 202-209.

S. Edinger, C. Bauer; "Concepts of Dynamic Adaptive DMT Modulation"; Second International Symposium on Commuications, Control and Signal Processing ISCCSP, 2006; isbn: 2-908849-17-8.

Bahram, Javidi et al, Application of wire-grid-mirror liquid crystal light valve in nonlinear joint transform correlators, Applied Optics, pp. 2834-2841, vol. 33. No, 14, 1994.

Guozhu Long et al, Competition stimulates technology advances: Experiences from ADSL development in Japan, IEEE Communications Magazine, Sep. 2005.

Amir Fazlollahi et al. "Error Probability of an optimum receiver designed for non-overlapping target ad scene noise," Journal of Optical Society of America-A (JOSA-A), vol. 14, No. 5, May 1997.

Bahram Javidi et al. "Binary nonlinear joint transform correlator performance with different thresholding methods under unknown illumination conditions," Applied Optics, Feb. 10, 1995, pp. 886-896, vol. 34, No. 5.

Amir Fazlollahi et al. "Minimum-error-probability receiver for detecting a noisy target in colored background noise," Jounral of Optical Society of America-A (JOSA-A), vol. 14, No. 4, Apr. 1997.

Amir Faziollahi et al. "Optimum receivers for pattern recognition problems with nonoverlapping target and background noise" Optical Engineering vol: 36, Issue: 10, Oct. 1997.

Amir Fazlollahi, "Optimum Processors for Pattern Recognition with Non-Overlapping Target and Scene Noise," Dec. 1995. University of Connecticut, Philosophy Department, Storrs, Connecticut.

Bahram Javidi et al. "Performance of nonlinear joint transform correlator for signals low-pass characteristics," Applied Optics, pp. 834-848, vol. 33, No. 5, 1994.

Bahram Javidi et al, "Nonlinear techniques in optical pattern recognition: introduction by the feature editors," Applied Optics, Jul. 10, 1995, pp. 3856-3857, vol. 34, No. 20.

PCT International Search report and Written Opinion, PCT/US07/68440, Mar. 25. 2008. 9 pages.

\* cited by examiner

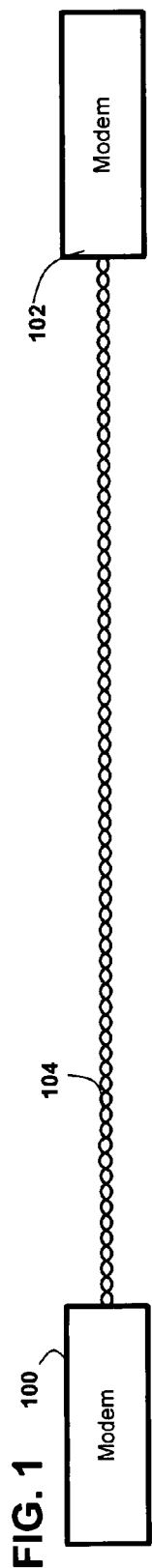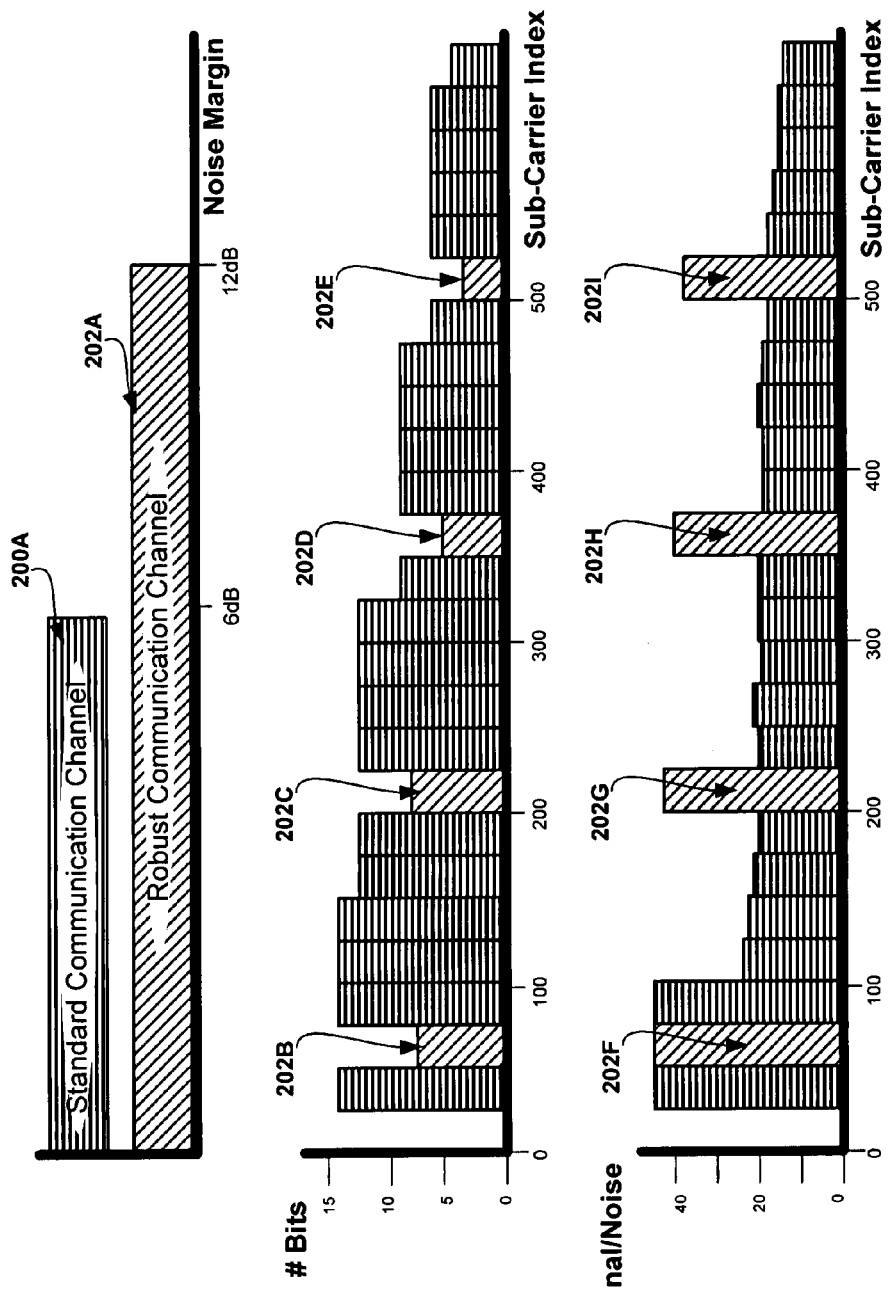
FIG. 1
FIG. 2A
FIG. 2B
FIG. 2C

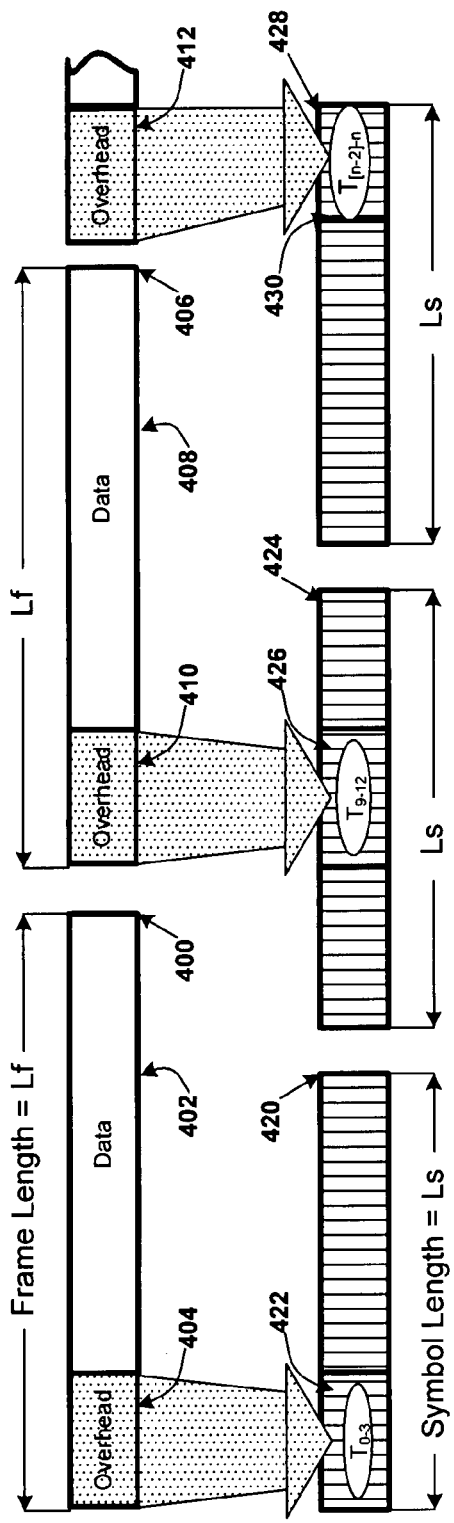
FIG. 4A Variable Tone Assignments for EOC PRIOR ART
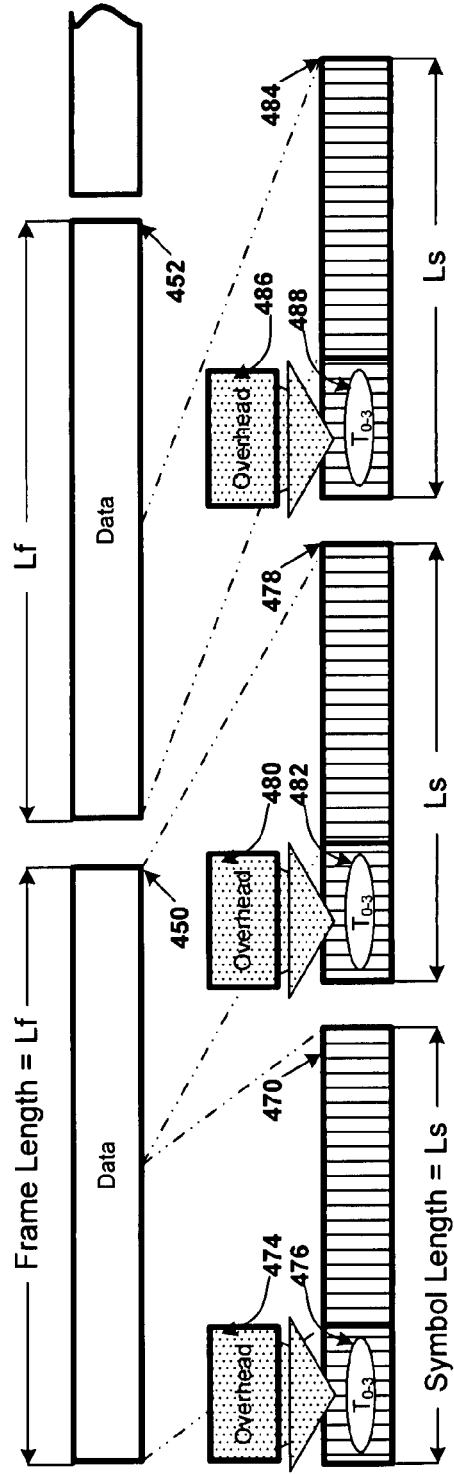
FIG. 4B Fixed Tone Assignments for RCC // METHOD AND APPARATUS FOR DIFFERENTIATED COMMUNICATION CHANNEL ROBUSTNESS IN A MULTI-TONE TRANSCEIVER

CROSS REFERENCE TO RELATED APPLICATION

This application claims the benefit of prior filed co-pending Provisional Application No. 60/844,880 filed on Sep. 15, 2006 entitled "Robust Rate Adaptation in DSL Modems" which is incorporated herein by reference in its entirety as if fully set forth herein.

BACKGROUND OF THE INVENTION

1. Field of Invention

The field of the present invention relates to multi-tone transceivers.

2. Description of the Related Art

In a digital multi-tone (DMT) based DSL systems (such as ADSL, ADSL2, ADSL2+, VDSL1, VDSL2), modems at either end of a telephone line, go through a training phase which determines the data rate that is to be sent over the line in both downstream and upstream directions. In each direction, the transmit part of the modem sends a known reference pattern on the line which is used by the receiver part of the modem at the other end of the line, to estimate the signal-to-noise ratio (SNR) on each of the tones. Based on the SNR of a tone, the constellation size that can be loaded is determined. This bit loading is typically done with some noise margin, say 'M' db, such that noise can increase by this noise margin amount of M db, without increasing the bit error rate (BER) beyond the target error rate. The bit table information consisting of the constellation size and the gain on each of the tones is exchanged between the modems and agreed on. The sum of the bits loaded on each tone is the bits per symbol in that direction, indicated by '$L_s$' in that direction. The modem's throughput in a direction, known as line rate, is calculated by multiplying '$L_s$' with the symbol rate.

At the end of the initialization, the modems go into "showtime" mode, where the modems start transmitting the user's payload data. The payload data is put into a DSL framing structure which defines a "frame" consisting of user payload data bytes, as well as overhead bytes and error correcting parity bytes (such as Reed-Solomon parity bytes). The overhead bytes are used for exchanging messages for operation and management of the modems. The bytes coming from the framing are sent through an interleaver for improving noise immunity to impulse noise. The interleaver output bytes are then modulated on to the tones as per the bit and gain tables agreed upon during initialization.

A change in bit-loading may also take place during this showtime phase, when for example, noise increases, e.g. due to additional lines coming up in a binder. The DSL standards have defined a procedure known as Seamless Rate Adaptation (SRA) for allowing rate adaptation during showtime. In the SRA method, the modems check the current SNR, and if the noise has changed, a bit loading based on the current SNR is performed, and if the noise has increased, then the line rate can be reduced by the new bit loading, and vice versa. The modems effect this change by the use of overhead bytes to exchange the new bit table information, and then switch to the new bit table, thereby changing the line rate to match the new noise conditions.

SRA is however susceptible to noise increases big enough to corrupt the data bytes since such noise increases also corrupt the overhead bytes containing a SRA message. When the message exchange fails to go through the modems drop the line and start retraining to the new noise conditions. This retraining can take 10 to 30 seconds which is not acceptable for many data types such as video or audio.

What is needed is an improved rate adaptation.

SUMMARY OF THE INVENTION

A multi-tone transceiver for multi-tone communications is disclosed. The multi-tone transceiver supports communication channels with differing degrees of robustness. The more robust of the communications channels may be utilized for transport of overhead and control information between opposing transceivers while the less robust channel may be used for user data, including audio, video and text.

In an embodiment of the invention the multi-tone transceiver includes: a channel controller and a plurality of components forming a transmit path and a receive path. The channel controller is configured to determine bit-loading for each successive symbol or tone set based on a $1^{st}$ noise margin target for a first subset of tones in each tone set dedicated to transport of a robust communications channel (RCC) and based on a $2^{nd}$ noise margin target less than the $1^{st}$ noise margin target for remaining tones in each tone set dedicated to a standard communications channel (SCC). The plurality of components forming the transmit and receive paths are responsive to the channel controller to for data modulated on a given tone at least one of smaller constellations and higher gain scaling levels when the given tone corresponds to an RCC tone as compared to an SCC tone, whereby the first set of tones dedicated to the RCC exhibit greater immunity to noise variations than the remaining tones dedicated to the SCC.

In another embodiment of the invention a method for operating a multi-tone transceiver is disclosed comprising:

dedicating a fixed subset of tones in each successive symbol to at least one robust communication channel (RCC) and remaining tones to a standard communication channel (SCC);

assigning a first noise margin target for data transported on the first set of tones dedicated to the RCC and a second noise margin target lower than the first noise margin for data transported on the remaining tones dedicated to the SCC; and determining bit-loading for the first set of tones dedicated to the RCC and remaining tones dedicated to the SCC based on the first and second noise margin targets respectively, whereby the first set of tones dedicated to the RCC exhibit greater immunity to noise variations than the remaining tones dedicated to the SCC.

In another embodiment of the invention a method for operating a pair of multi-tone transceivers coupled to one another across a communication medium is disclosed comprising:

dedicating a fixed subset of tones in each successive symbol to at least one robust communication channel (RCC) and remaining tones to a standard communication channel (SCC);

assigning a first noise margin target for data transported on the first set of tones dedicated to the RCC and a second noise margin target lower than the first noise margin for data transported on the remaining tones dedicated to the SCC; and transmitting RCC and SCC tone dedication information and target first and second noise margins to an opposing one of the pair of transceivers.

In another embodiment of the invention a means for operating a multi-tone transceiver is disclosed comprising:

means for dedicating a fixed subset of tones in each successive symbol to at least one robust communication channel (RCC) and remaining tones to a standard communication channel (SCC);

means for assigning a first noise margin target for data transported on the first set of tones dedicated to the RCC and a second noise margin target lower than the first noise margin for data transported on the remaining tones dedicated to the SCC; and means for determining bit-loading for the first set of tones dedicated to the RCC and remaining tones dedicated to the SCC based on the first and second noise margin targets respectively, whereby the first set of tones dedicated to the RCC exhibit greater immunity to noise variations than the remaining tones dedicated to the SCC.

BRIEF DESCRIPTION OF THE DRAWINGS

These and other features and advantages of the present invention will become more apparent to those skilled in the art from the following detailed description in conjunction with the appended drawings in which:

FIG. 1 is a system diagram of an embodiment of the invention in which the transceivers comprise modems coupled to one another via a subscriber line.

FIGS. 2A, 2B, 2C are graphs of noise margin, bit-loading and signal-to-noise ratios respectively for multi-tone modems supporting robust and standard communications channels.

FIG. 4A is a signal processing diagram of a prior art approach to loading frame data onto each sub-channel or tone of a multi-tone symbol or tone set.

FIG. 4B is a signal processing diagram of an embodiment of the invention directed to loading frame data onto each sub-channel or tone of a multi-tone symbol or tone set.

DETAILED DESCRIPTION OF THE EMBODIMENTS

Figure 3:
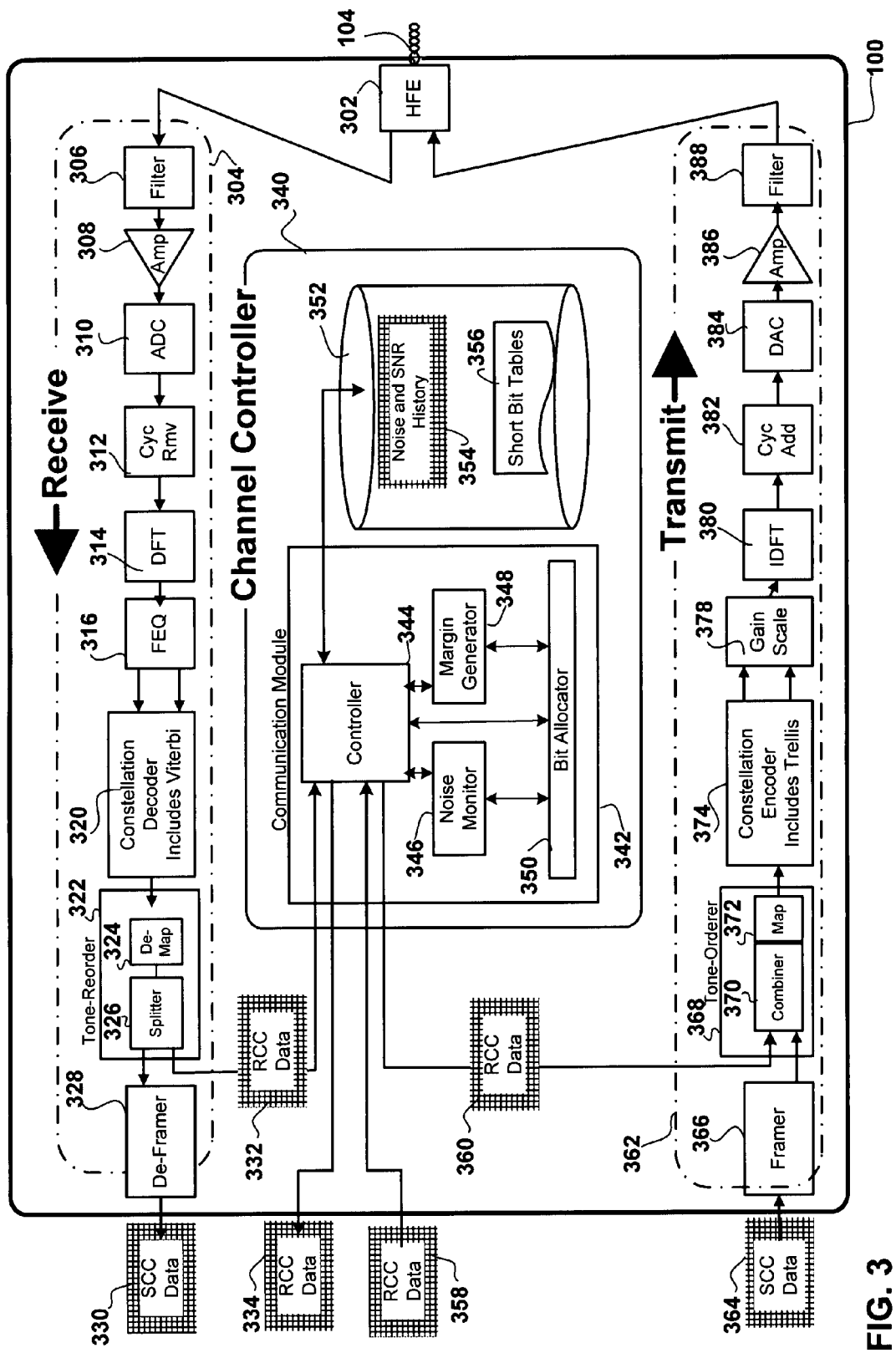
FIG. 3 is a detailed hardware block diagram of one of the modems shown in FIG. 1 in accordance with an embodiment of the invention.

A multi-tone transceiver for multi-tone communications is disclosed. The multi-tone transceiver supports communication channels with differing degrees of robustness for multi-tone protocols including: asymmetric digital subscriber line (ADSL); very high bit rate digital subscriber line (VDSL) and other orthogonal frequency division multiplexing (OFDM) plans including but not limited to the following:

TABLE 1

| Standard name | Common name | Downstream rate | Upstream rate |
| --- | --- | --- | --- |
| ANSI T1.413-1998 Issue 2 | ADSL | 8 Mbit/s | 1.0 Mbit/s |
| ITU G.992.1 | ADSL (G.DMT) | 8 Mbit/s | 1.0 Mbit/s |
| ITU G.992.1 Annex A | ADSL over POTS | 8 Mbit/s | 1.0 MBit/s |
| ITU G.992.1 Annex B | ADSL over ISDN | 8 Mbit/s | 1.0 MBit/s |
| ITU G.992.2 | ADSL Lite (G.Lite) | 1.5 Mbit/s | 0.5 Mbit/s |

TABLE 1-continued

| Standard name | Common name | Downstream rate | Upstream rate |
| --- | --- | --- | --- |
| ITU G.992.3/4 | ADSL2 | 12 Mbit/s | 1.0 Mbit/s |
| ITU G.992.3/4 Annex J | ADSL2 | 12 Mbit/s | 3.5 Mbit/s |
| ITU G.992.3/4 Annex L | RE-ADSL2 | 5 Mbit/s | 0.8 Mbit/s |
| ITU G.992.5 | ADSL2+ | 24 Mbit/s | 1.0 Mbit/s |
| ITU G.992.5 Annex L[1] | RE-ADSL2+ | 24 Mbit/s | 1.0 Mbit/s |
| ITU G.992.5 Annex M | ADSL2+M | 24 Mbit/s | 3.5 Mbit/s |
| ITU G.993.1 | VDSL | | |
| ITU G.993.2 | VDSL 2 | | |
| IEEE 802.16e | WiMax | | |
| IEEE 802.20 | Mobile Broadband Wireless Access | 1 Mbit/s | 1 Mbit/s |

The more robust of the communications channels may be utilized for transport of overhead and control information between opposing transceivers while the less robust channel may be used for user data, including audio, video and text.

FIG. 1 is a system diagram of an embodiment of the invention in which the transceivers comprise modems coupled to one another via a subscriber line. Modems 100 and 102 are shown coupled to one another via a subscriber line 104. In alternate embodiments of the invention the communication medium may comprise a wireless communication medium.

FIGS. 2A, 2B, 2C are graphs of noise margin, bit-loading and signal-to-noise ratios respectively for multi-tone modems supporting robust and standard communications channels. In FIG. 2A a robust communication channel (RCC) 202A and a standard communication channel (SCC) 200A are shown. The RCC's robustness arises in part from the higher noise margin target assigned to the tones associated with that channel which make that channel more resistant to noise variations on the communication medium than the SCC channel.

FIGS. 2B and 2C show one of the directions of communications between the modems, i.e. upstream or downstream. Similar graphs covering a different portion of the spectrum would apply for the opposing direction of communication. In FIG. 2B a portion of sub-channels a.k.a. tones associated with the upstream spectrum between the two modems shown in FIG. 1 is shown. A fixed set of tones, e.g. 202B, 202C, 202D, 202E in each successive tone-set, a.k.a. symbol, is dedicated to the upstream transport of the data associated with the RCC channel. The remaining tones are dedicated to the upstream transport of the data associated with the SCC channel. As shown in FIG. 2B the bit-loading for a given SNR of the tones dedicated with the RCC channel is less than the bit-loading of the tones dedicated to the SCC channel. The tones/sub-channels dedicated to transport of the RCC may also exhibit higher gain scaling than the tones dedicated to the transport of the SCC. These characteristics arise from the relatively higher noise margin target assigned to the RCC channel as compared to the SCC channel during bit-loading determinations. FIG. 2C shows signal-to-noise ratios (SNR) for the RCC associated tones/sub-channels, e.g. 202F, 202G, 202H, 202I and the remaining tones or sub-channels associated with the SCC. Generally the combination of higher noise margin and possibly greater gain scaling results in higher SNR for the tones dedicated to the RCC transport as compared with the remaining tones dedicated to the transport of the SCC.

FIG. 3 is a detailed hardware block diagram of one of the modems 100 shown in FIG. 1 in accordance with an embodiment of the invention. The modem includes a plurality of components forming the transmit path 362 and the receive path 304 as well as a channel controller 340.

The receive path 304 couples to subscriber line 104 via the hybrid front end 302. The received analog signal is subject to analog filtration in filter 306 and amplification in amplifier 308. The received analog signal is converted to a digital signal in analog-to-digital converter 310. Then after any required down-conversion is digitally performed, cyclic prefixes or suffixes are removed in the cyclic removal module 312. Next the received digital signal is transformed from the time to the frequency domain in a discrete Fourier transform module 314 and each resultant set of tones is subject to frequency domain equalization (FEQ) in the FEQ 316. This latter process normalizes frequency dependent signal gain variations in the received tones. The complex number corresponding to the phase and amplitude on each sub-channel or tone is then decoded into corresponding bits in the constellation decoder 320. Forward error correction (FEC) decoding, e.g. Viterbi decoding, may also performed at this time. In an embodiment of the invention the Viterbi decoding is limited to the tones assigned to the tones associated with the SCC, since the RCC tones in an embodiment of the invention are not subject to FEC. Then, in the tone-re-orderer the tones are de-mapped by the de-mapper 324 and split into RCC and SCC data in the splitter 326. Variations in noise on the subscriber line may occasionally result in bit errors during decoding and de-mapping. The relatively higher noise margin target assigned to the subset of tones dedicated to transport of the RCC increases the immunity of the RCC data to these noise fluctuations. This immunity is evidenced by a reduced bit error rate (BER) for the RCC data as compared with the SCC data transported on the remaining tones dedicated to the SCC. The resultant RCC data 332 is passed to the channel controller 340 and the resultant SCC data is passed to the de-framer 328 for de-framing and any required de-interleaving and further de-coding. The de-framed SCC data 330, output by the de-framer, is passed to the network or device to which the modem is coupled.

The transmit path 362 includes a framer 366 the input to which is the SCC data 364 from the network or device to which the modem is attached. The framer performs any interleaving and Reed-Solomon or other FEC as called for on the SCC data. The RCC data 360 enters the transmit path at the tone-orderer 368 where it is combined by the combiner 370 with the framed SCC data. Both SCC and RCC data are then mapped by mapper 372 to the corresponding tones dedicated to each of the channels. Next the data bits in each tone or sub-channel are converted by the constellation encoder 374 into a corresponding complex value number representative of a combination of phase and amplitude for the bits in the associated constellation as identified in the bit allocation table received from the opposing modem. Any required FEC, e.g. Trellis encoding is also performed at this time. In an embodiment of the invention Trellis encoding is only performed on the remaining tones dedicated to transporting SCC data and not on the subset of tones dedicated to the transport of RCC data. Next gain scaling at levels identified in BAT and PAT tables received from the opposing modem is performed by the gain scaler 378 for the RCC and SCC data. The robustness of the RCC may result in part from comparatively higher gain scaling of its associated tones as compared to the remaining tones dedicated to the SCC. A transformation from the frequency to the time domain is then performed on all the tones or sub-channels by the inverse discrete Fourier transform (IDFT) module 380. The resultant symbol is subject to any required cyclic extension, e.g. prefix or suffix, in the cyclic adder 382. After any required up conversion a digital-to-analog (DAC) conversion is performed in DAC 384. The output of the DAC is amplified in amplifier 386 and filtered in filter 388 before passing to the subscriber line 104 via the HFE 302.

The channel controller 340 includes a communication module 342 and memory 352. The memory contains channel records such as signal-to-noise and noise level history 354 and bit (BAT) and power allocation (PAT) tables 356. The communication module includes a controller 344, a noise monitor 346, a noise margin generator 348 and a bit allocator 350.

The channel controller determines which tones will be assigned to transport of RCC and SCC data and then the margin generator 348 sets the noise margin targets for the RCC higher than the SCC. These assignments are passed to the opposing modem during the training phase of the modem's operation. In an embodiment of the invention the margin generator uses the SNR and noise history records 354 stored in memory 352 to intelligently adjust noise margins for the RCC and the SCC. If for example the noise history indicates noise has already increased since training by 15 dbm/Hz, the probability of additional cross talk noise due to further disturbers is lower, in which case the noise margins on the SCC could be reduced.

As the noise monitor 346 gathers information on bit error rate (BER) and signal-to-noise ratios (SNR) from the received data it records these in memory 352. Once the noise monitor has identified these parameters for all received tones, control is passed to the bit allocator. The bit allocator 350 determines bit loading for the RCC and SCC subject to the noise margin targets from the margin generator and the SNR measured by the noise monitor. The bit allocator generates both bit allocation (BAT) and power application (PAT) tables for transport to the opposing modem, which then reconfigures its transmit path accordingly. Once the RCC is established it is used to transport control information, such as embedded operations, BAT and PAT tables etc. to the opposing modem. The transport of this critical information on the higher noise margin RCC increases the stability of the modem during noise fluctuations on the subscriber line. This increased stability, results both from the ability of the modems to maintain communications during noise fluctuations as well as their ability to dynamically adapt their transmit and receive paths to these fluctuations after the appropriate control information has been gathered and exchanged between the modems on their RCC link.

There are many bit-loading algorithms which attempt to maximize throughput over a multi-tone link by assignment of constellation size and gain level to each sub-channel. Bit-loading determinations are typically made not only during a training phase of transceiver operation but also during a show time phase to cope with variations in noise levels on the communication medium, e.g. subscriber line. Transceivers dynamically adapt bit-loading when variations in noise levels on the subscriber line elevate bit error rates (BER) to unacceptable levels. In response to changed noise levels transceivers re-determine bit loading and power allocation for each sub-channel to make the most efficient use of the spectrum. These changes must not elevate overall signal power beyond a power level provided by a corresponding standard, or in the case of each tone or sub-channel beyond the level of a corresponding power mask. The bit-loading determination made by a receiving one of the transceivers, results in the generation and transport of bit allocation (BAT) and power allocation (PAT) tables to the opposing one of the modems along with a time stamp indicating when the tables become valid. Upon receipt of these tables the opposing modem makes the corresponding adjustments to its transmissions at the indicated time, typically delineated in terms of a frame counter.

The different noise margin targets for the RCC and SCC may comprise fixed values about which the bit loading algorithm maximizes bit rates. Alternately, the different noise margin targets for the RCC and SCC may comprise fixed lower limits which are maximized by the bit loading algorithm subject to the constraint of a target bit rate.

The following equations identify detailed processes performed in the communication modules, noise monitor 346 and bit allocator 350 modules.

Equation 1 identifies the variance of the noise on the $k_{th}$ sub-channel:

$$\hat{\sigma}_k^2 = \frac{1}{M} \sum_{m=1}^{M} |E_{m,k}|^2 \quad \text{Equation 1}$$

where m is symbol index for the M symbols over which noise is averaged, $E_{m,k}$ is error on $k_{th}$ tone in the $m_{th}$ symbol.

Equation 2 is an expression for the bit-loading on a given sub-channel or tone for a given error probability $P_e$:

$$b_k = \log_2 \left( \frac{SNR_k * \gamma_c}{\Gamma(P_e) * \gamma_{m_{Channel}}} + 1 \right) \quad \text{Equation 2}$$

where $SNR_k$ is the signal-to-noise ratio for the $k_{th}$ tone, $\gamma_c$ (gamma sub-c) is the coding gain due to forward error correction, $\Gamma(P_e)$ is the Shannon Gap and $\gamma_{m\ Channel}$ (gamma sub-m sub-channel) is the noise margin for all tones associated with a corresponding one of the robust (RCC) or standard (SCC) communication channels.

Equation 3 expresses the signal-to-noise ratio on the $k_{th}$ tone or sub-channel:

$$SNR_k = \frac{\varepsilon_k |H_k|^2}{2\sigma_k^2} \quad \text{Equation 3}$$

where $\varepsilon_k$ is the average input signal energy per two-dimensional QAM sub-symbol, $H_k$ is the gain of the $k_{th}$ sub-channel and $\sigma_k^2$ is the received noise variance per dimension on the $k_{th}$ tone or sub-channel. For a tone dedicated to the RCC set the target noise margin, $\gamma_{m_{RCC}}$ will be higher and therefore for a given SNR as can be seen from Equation 2 the target noise margin will be achieved by reducing the bit loading. Alternately, the higher noise margin for the RCC tones can be achieved by requesting the transmitter to increase the gain for that tone which will increase the signal energy and resulting in an increase in the SNR for that tone.

The RCC need not be limited to the transport of control information. In an embodiment of the invention it may also be used to transport user data, e.g. audio or video which requires a high quality of service (QOS). In this embodiment of the invention the external user data 358 identified for RCC transport is passed to the controller 344 where it is combined with existing RCC data 360 for transport to the opposing modem. Similarly user data 344 received on the RCC is output by controller 344.

In alternate embodiments of the current invention the speed and accuracy of rate adaption may be further improved by measures such as: short and long form signal-to-noise ratio (SNR) determination and short and long form bit and power allocation tables. Typically SNR determinations are made over an extended number of symbols or tone sets and hence a considerable amount of time may be required to detect increases in noise margins requiring rate adaptation. This detection interval can be shortened by tracking both short and long term SNR for purposes of triggering a rate adaptation. Typically bit-loading determinations require extended processing due to the large number of tones associated with some of the more recent multi-tone standards such as VDSL. The bit-loading determination may be altered to include both short and long form determination algorithms. A short form bit-loading can be accomplished by grouping adjacent subsets of tones into groups and determining relative bit-loading variations uniformly across the group. For example if the group is reduced by 2 bits: a tone with 8 bits will be reduced to 6 and a tone with 4 will be reduced to 2. The resultant short form BAT and PAT are then passed to the opposing modem for quick rate adaptation. The long form bit-loading determination uses a long form (term) SNR average and calculates each tones bit-loading individually and generates long form BAT and PAT which are then passed to the opposing modem for a more granular rate adaptation. In an embodiment of the invention, short form SNR determination and short form BAT and PAT are passed to the opposing modem during the first stage of rate adaptation, followed by a more detailed long form SNR calculation and resulting long form BAT and PAT transport to the opposing modem during a second stage of rate adaptation. This approach, i.e. short form followed by long form, allows the sort of stepped rate adaptation shown in FIG. 5 line 502, where $r_1$ corresponds to the short form adapted rate and $r_2$ the long form adapted rate.

FIG. 4A is a signal processing diagram of a prior art approach to loading frame data onto each sub-channel or tone of a multi-tone symbol or tone set. A succession of frames e.g. 400 and 406 are shown each with an associated data portion, e.g. 402 and 408, as well as an associated overhead portion 404, 410, and 412. The overhead portion contains an embedded overhead channel used for passing modem control information during training and showtime. The data portion contains user data, e.g. audio, video or text. The length of each frame $L_f$ is uniform and typically not equal to the length of each symbol $L_s$ or tone-set. Successive symbols 420, 424 and 428 are shown. As a result of the disparity in length between frames and symbols, the overhead data appears on different tones 422, 426 and 430 in the successive symbols, 420, 424, and 428 respectively. Control information is thus transported with the same noise immunity as the rest of the data. Thus fluctuations in noise levels which are severe enough to degrade the transport reliability of user data, will also degrade control information, thereby bringing the link down until re-training is completed. In this prior art scheme, each byte in the frame, whether it be overhead or user data is equally likely to get corrupted when there is noise increase.

The current invention overcomes this problem by sub-segmenting the upstream and downstream spectrum into dedicated sub-channels or tones for a RCC to which relatively higher noise margins apply as opposed to the remaining sub-channels dedicated to the SCC, as shown in the following FIG. 4B.

FIG. 4B is a signal processing diagram of an embodiment of the invention directed to loading frame data onto each sub-channel or tone of a multi-tone symbol or tone set. A succession of frames 450 and 452 are shown each with length Lf and each containing only user data, e.g. audio, video, text. The data in these frames is mapped to the tones associated with the SCC while the overhead data 474, 480, 486 e.g. BAT and PAT, is injected into a dedicated fixed set of tones 476, 482, 488 in each symbol 470, 478, 484 respectively. The tones dedicated to the RCC may be adjacent to one another as shown in FIG. 4B or spread apart from one another as shown in FIGS. 2B and 2C. The creation of a dedicated set of tones for transport of the overhead information in combination with the relatively higher noise margins assigned to same, improves the noise immunity of the entire link, by allowing reliable transport of adaptive bit-loading tables and other control information during fluctuations in line noise, thus avoiding retraining.

Figure 5:
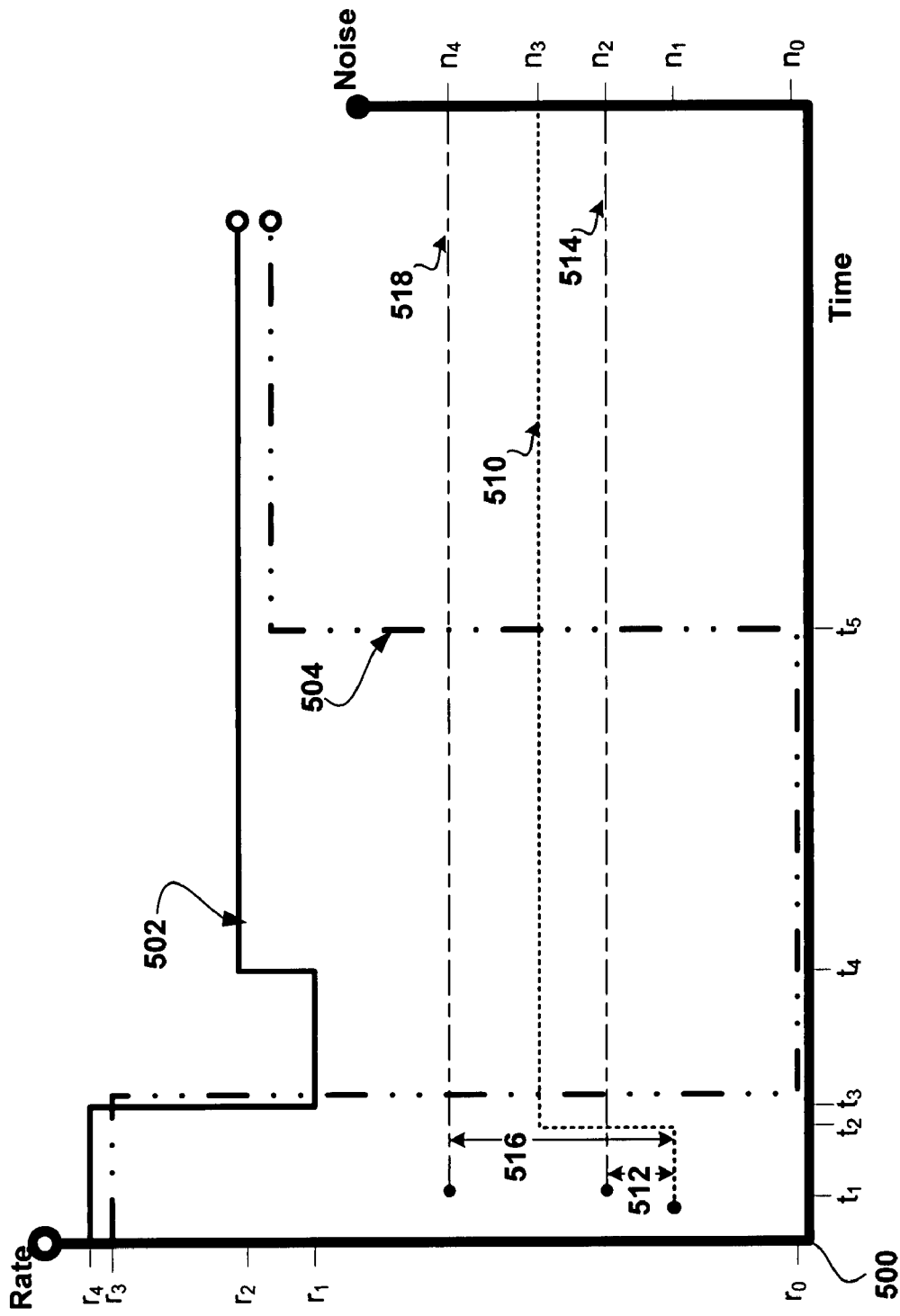
FIG. 5 is a graph of rate and noise over time showing an embodiment of the invention for adapting bit-rate responsive to variations in noise levels on the communication medium connecting the modems shown in FIG. 1.

FIG. 5 is a graph 500 of rate and noise over time showing an embodiment of the invention for adapting bit-rate responsive to variations in noise levels on the communication medium connecting the modems shown in FIG. 1. In the FIG. 5 the solid line 502 shows the rate change of a modem with an RCC, and the dashed-&-dot line 504 shows the rate change of a modem without RCC. Dotted line 510 shows a representative noise increase from n1 to n3 on the subscriber line just before time $t_2$.

For the RCC case the noise margin 516 is assigned to the RCC and the noise margin 512 is assigned to the SCC. Noise 510 never rises above the upper limit 518 of the RCC's immunity, though it does rise above the upper limit 514 of the SCC's immunity. Time $\Delta(t_2\text{-}t_3)$ is the time to detect noise increase and to reduce the rate to a safe rate, e.g. rate reduction through the compressed sub-optimal bit table exchange, and $\Delta(t_3\text{-}t_4)$ is the time to reach converged rate, e.g. rate increase through full optimal bit-table exchange after a long averaging to get the optimum SNR. Also, $r_4$ is the initial rate, $r_1$ is the safe rate, e.g. rate after rate reduction and $r_2$ is the converged rate, e.g. rate after rate increase. Note that $\Delta(t_2\text{-}t_3)$ is the time during which traffic can potentially have cyclic redundancy check (CRC) errors, and is called the traffic errored period, and assuming there is no further increase in noise, there should be no CRC errors in the time while operating at the safe rate or converged rate.

Line 504 shows what happens to modems operating without an RCC. When noise increases beyond the upper limit 514 associated with margin 512, the control information, e.g. messages themselves are errored and hence rate change cannot be accomplished, which causes the modem to drop the link and retrain. After going through the retraining (typically 20 to 30 secs), the rate comes back to $r_2$ but meanwhile, the user is without a service for this duration of re-training.

Figure 6:
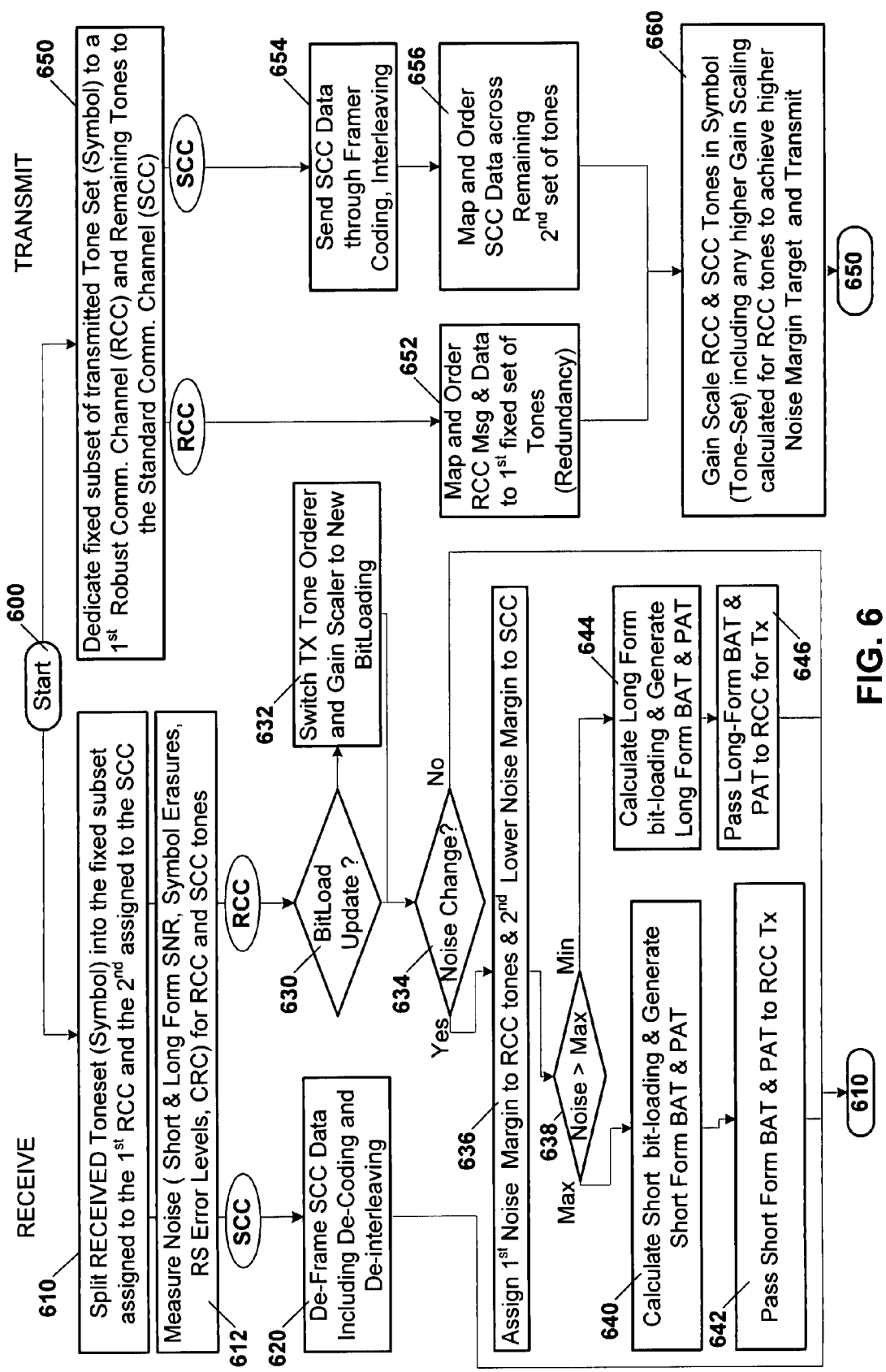
FIG. 6 is a process flow diagram of transmit and receive processing of both robust and standard communication channels in accordance with an embodiment of the invention.

FIG. 6 is a process flow diagram of transmit and receive processing of both robust and standard communication channels in accordance with an embodiment of the invention. In the startup phase, the modems exchanging capabilities including support for RCC. If RCC is supported by both modems target first and second noise margins are exchanged. After startup 600 receive processing commences at process 610 in which the received tones are split into a fixed subset dedicated to the RCC and remaining tones assigned to the SCC. Then in process 612 noise is measured in terms of one or more of the following: short and long form/term SNR, symbol erasures, Reed Solomon error levels, cyclic redundancy checks, etc. The resultant noise level determinations are updated for SCC and RCC tones or sub-channels. SCC tones are subject to de-framing and any associated Reed Solomon or other decoding and de-interleaving in process 620. Processing for SCC tones then returns to process 610.

If the data received on the RCC tones contains new bit loading (BAT) or power application (PAT) tables then in decision process 630 control is passed to process 632. In process 632 the channel controller 340 (See FIG. 3) switches the transmit path's tone orderer and gain scaler components to the new bit-loading and gain scaling values respectively.

Next in decision process 634 a determination is made as to whether a change in bit loading is required. If noise remains within the no-change range, then control returns to process 610. If not, control passes to process 636 in which $1^{st}$ and $2^{nd}$ noise margin targets are assigned for the RCC and SCC.

Next in decision process 638 a determination is made as to whether noise has fallen below a minimum threshold, or risen above a maximum threshold. Where noise has risen above the maximum threshold control passes to process 640. In process 640 short form bit-loading calculations are performed and the corresponding short form BAT and PAT are generated. Short form bit-loading calculations are performed by consolidating adjacent tones into groups and performing bit-loading on each group rather than each tone. This short form approach may also be combined with an abbreviated SNR determination, with a very short look back range. Next in process 642 the short form BAT and PAT are transmitted to the opposing modem on the RCC tones.

If alternately a determination is made in decision process 638 that noise levels have fallen below a minimum threshold, then control is passed to process 644. In process 644 a long form bit-loading determination is completed, on a tone by tone basis and then in process 646, the corresponding long form BAT and PAT are subsequently transmitted to the opposing modem on the RCC tones.

When a short form bit loading adaptation is done, it is usually not optimal, and afterwards will typically be followed by a long form adaptation. This stepwise adaptive bit-loading calculation results in the stepped adaptation of bit-loading shown in FIG. 5, line 502.

Transmit path processing commences at process 650 in which a fixed subset of the transmitted tone set or symbol is dedicated to the RCC and remaining tones to the SCC. Processing of the SCC comprises in process 654 sending SCC data through the framer for framing and any associated coding or interleaving followed by introduction into a mapper in process 656 which maps the SCC bits to the appropriate dedicated SCC tones. Processing of the RCC data, e.g. message, overhead and control data, and in an embodiment of the invention user data with a high quality of service requirement (QOS) is conducted in process 652. The RCC data is introduced directly into the mapper and the RCC bits are mapped to the appropriate dedicated RCC tones. Next in process 660 both the SCC and RCC tones are subject to gain scaling as called for in the PAT with any higher gain scaling called for therein applied to the RCC tones. The data is then transmitted to the opposing modem.

The foregoing description of a preferred embodiment of the invention has been presented for purposes of illustration and description. It is not intended to be exhaustive or to limit the invention to the precise forms disclosed. Obviously many modifications and variations will be apparent to practitioners skilled in this art. It is intended that the scope of the invention be defined by the following claims and their equivalents.

What is claimed is:

1. A method for operating a multi-tone transceiver comprising:
   dedicating a fixed subset of tones in each successive symbol to at least one robust communication channel (RCC) and remaining tones to a standard communication channel (SCC);
   assigning a first noise margin target for data transported on the first set of tones dedicated to the RCC and a second noise margin target lower than the first noise margin for data transported on the remaining tones dedicated to the SCC; and determining bit-loading using a channel controller, for the first set of tones dedicated to the RCC and remaining tones dedicated to the SCC based on the first and second noise margin targets respectively, whereby the first set of tones dedicated to the RCC exhibit greater immunity to noise variations than the remaining tones dedicated to the SCC.

2. The method for operating a multi-tone transceiver of claim 1, wherein the dedicating act further comprises:
transmitting information identifying the fixed subset of tones dedicated to the RCC and the remaining tones dedicated to the SCC.

3. The method for operating a multi-tone transceiver of claim 1, wherein the determining act further comprises:
selecting for data modulated on a given tone at least one of smaller constellations and higher gain scaling levels when the given tone corresponds to an RCC tone as compared to an SCC tone.

4. The method for operating a multi-tone transceiver of claim 1, wherein the determining act further comprises:
transmitting over the first set of tones dedicated to the RCC both bit-loading and gain scaling tables exhibiting at least one of smaller constellations and higher gain scaling levels for data modulated on the first set of tones dedicated to the RCC than for data modulated on the remaining tones dedicated to the SCC.

5. The method for operating a multi-tone transceiver of claim 1, wherein the determining act further comprises:
monitoring noise levels for data received on the RCC and SCC;
detecting noise levels above a threshold level;
re-determining bit-loading for at least the remaining tones dedicated to the SCC based on the second noise margin target; and
re-transmitting over the first set of tones dedicated to the RCC updated bit-loading and gain scaling tables for at least the remaining tones dedicated to the SCC.

6. The method for operating a multi-tone transceiver of claim 1, wherein the determining act further comprises:
monitoring noise levels for data received on the RCC and SCC;
detecting noise levels above a threshold level;
re-determining bit-loading for at least the remaining tones dedicated to the SCC based on the second noise margin target and further based on grouping adjacent tones into groups for each of which a single bit-loading variation applies, thereby simplifying the bit-loading redetermination; and
re-transmitting over the first set of tones dedicated to the RCC updated bit-loading and gain scaling tables for at least the remaining tones dedicated to the SCC.

7. The method for operating a multi-tone transceiver of claim 1, further comprising:
performing forward error correction (FEC) exclusively on data transmitted on the remaining tones dedicated to the SCC thereby avoiding FEC on data transmitted on the first set of tones dedicated to the RCC.

8. A method for operating a pair of multi-tone transceivers coupled to one another across a communication medium, and the method comprising:
dedicating a fixed subset of tones in each successive symbol to at least one robust communication channel (RCC) and remaining tones to a standard communication channel (SCC);
assigning a first noise margin target for data transported on the first set of tones dedicated to the RCC and a second noise margin target lower than the first noise margin for data transported on the remaining tones dedicated to the SCC; and
transmitting RCC and SCC tone dedication information and target first and second noise margins to an opposing one of the pair of transceivers.

9. The method for operating a pair of multi-tone transceivers of claim 8, further comprising:
determining, in each of the pair of transceivers, bit-loading for the first set of tones dedicated to the RCC and remaining tones dedicated to the SCC based on the first and second noise margin targets respectively; and
transmitting over the RCC the bit-loading and gain scaling tables determined in the determining act to an opposing one of the pair of transceivers, whereby the first set of tones dedicated to the RCC exhibit greater immunity to noise variations than the remaining tones dedicated to the SCC.

10. The method for operating a pair of multi-tone transceivers of claim 8, further comprising:
selecting for data modulated on a given tone at least one of smaller constellations and higher gain scaling levels when the given tone corresponds to an RCC tone as compared to an SCC tone, thereby effecting the noise margin targets assigned in the assigning act; and
transmitting over the RCC information identifying the constellations and gain scaling levels selected in the selecting act to an opposing one of the pair of transceivers, whereby the first set of tones dedicated to the RCC exhibit greater immunity to noise variations than the remaining tones dedicated to the SCC.

11. The method for operating a pair of multi-tone transceivers of claim 8, further comprising:
transporting both control information for operation of the pair of transceivers together with user data requiring an elevated quality of service (QOS) over the RCC; and
transporting user data having a relatively lower QOS over the SCC.

12. A means for operating a multi-tone transceiver comprising:
means for dedicating a fixed subset of tones in each successive symbol to at least one robust communication channel (RCC) and remaining tones to a standard communication channel (SCC);
means for assigning a first noise margin target for data transported on the first set of tones dedicated to the RCC and a second noise margin target lower than the first noise margin for data transported on the remaining tones dedicated to the SCC; and
means for determining bit-loading for the first set of tones dedicated to the RCC and remaining tones dedicated to the SCC based on the first and second noise margin targets respectively, whereby the first set of tones dedicated to the RCC exhibit greater immunity to noise variations than the remaining tones dedicated to the SCC.

13. The means for operating a multi-tone transceiver of claim 12, wherein the means for dedicating further comprises:
means for transmitting information identifying the fixed subset of tones dedicated to the RCC and the remaining tones dedicated to the SCC.

14. The means for operating a multi-tone transceiver of claim 12, wherein the means for determining further comprises:
means for selecting for data modulated on a given tone at least one of smaller constellations and higher gain scaling levels when the given tone corresponds to an RCC tone as compared to an SCC tone.

15. The means for operating a multi-tone transceiver of claim 12, wherein the means for determining further comprises:
means for transmitting over the first set of tones dedicated to the RCC both bit-loading and gain scaling tables exhibiting at least one of smaller constellations and higher gain scaling levels for data modulated on the first set of tones dedicated to the RCC than for data modulated on the remaining tones dedicated to the SCC.

16. The means for operating a multi-tone transceiver of claim 12, wherein the means for determining act further comprises:
means for monitoring noise levels for data received on the RCC and SCC;
means for detecting noise levels above a threshold level;
means for re-determining bit-loading for at least the remaining tones dedicated to the SCC based on the second noise margin target; and
means for re-transmitting over the first set of tones dedicated to the RCC updated bit-loading and gain scaling tables for at least the remaining tones dedicated to the SCC.

17. The means for operating a multi-tone transceiver of claim 12, further comprising:
means for performing forward error correction (FEC) exclusively on data transmitted on the remaining tones dedicated to the SCC thereby avoiding FEC on data transmitted on the first set of tones dedicated to the RCC.

18. A multi-tone transceiver for multi-tone communications comprising:
a channel controller configured to determine bit-loading for each successive symbol based on a $1^{st}$ noise margin target for a first subset of tones in each tone set dedicated to transport of a robust communications channel (RCC) and based on a $2^{nd}$ noise margin target less than the $1^{st}$ noise margin target for remaining tones in each tone set dedicated to a standard communications channel (SCC); and
a plurality of components forming a transmit path and a receive path responsive to the channel controller to select for data modulated on a given tone at least one of smaller constellations and higher gain scaling levels when the given tone corresponds to an RCC tone as compared to an SCC tone, whereby the first set of tones dedicated to the RCC exhibit greater immunity to noise variations than the remaining tones dedicated to the SCC.

19. The multi-tone transceiver of claim 18, wherein the plurality of components further comprise:
components configured to performing forward error correction (FEC) exclusively on data transmitted on the remaining tones dedicated to the SCC and to avoid FEC on data transmitted on the first set of tones dedicated to the RCC.

20. The multi-tone transceiver of claim 18, wherein the plurality of components further comprise:
components configured to transmit over the RCC bit-loading information determined by the channel controller, thereby increasing the noise immunity of the multi-tone transceiver.

21. The multi-tone transceiver of claim 18, wherein the plurality of components further comprise:
components configured to transmit both control information for transceiver operation together with user data requiring an elevated quality of service (QOS) over the RCC and to transmit user data having a relatively lower QOS over the SCC.

* * * * *